United States Patent [19]

Hurley et al.

[11] Patent Number: 5,468,432
[45] Date of Patent: Nov. 21, 1995

[54] PROCESS FOR THE PREPARATION OF FILLED URETHANE-BASED REINFORCED MOLDINGS

[75] Inventors: Michael F. Hurley, Oakdale; Clifford J. Lau, Sewickley; Bin Lee, Coraopolis, all of Pa.

[73] Assignee: Bayer Corporation, Pittsburgh, Pa.

[21] Appl. No.: 416,103

[22] Filed: Apr. 4, 1995

Related U.S. Application Data

[63] Continuation of Ser. No. 123,318, Sep. 17, 1993, abandoned.
[51] Int. Cl.⁶ .................................................. B29C 45/00
[52] U.S. Cl. .......................... 264/45.3; 264/50; 264/300; 264/328.18
[58] Field of Search .................. 264/50, 328.6, 264/328.18, 300, 45.3

[56] References Cited

U.S. PATENT DOCUMENTS

| | | | |
|---|---|---|---|
| 4,381,352 | 4/1983 | McBrayer | 521/115 |
| 4,436,841 | 3/1984 | Rasshofer et al. | 521/106 |
| 4,564,491 | 1/1986 | Koestecki | 264/108 |
| 4,590,219 | 5/1986 | Nissen et al. | 521/51 |
| 4,645,630 | 2/1987 | Rasshofer et al. | 264/54 |
| 4,663,388 | 5/1987 | Douglass et al. | 525/54.3 |
| 4,680,214 | 7/1987 | Frisch et al. | 428/267 |
| 4,695,509 | 9/1987 | Cordova et al. | 428/267 |
| 4,783,295 | 11/1988 | Kearns et al. | 264/50 |
| 4,861,803 | 1/1992 | Turner | 521/37 |
| 5,079,084 | 1/1992 | Kondo et al. | 428/324 |
| 5,244,613 | 9/1993 | Hurley et al. | 264/50 |

OTHER PUBLICATIONS

S. H. Metger, Jr. & K. Seel, "High Modulus Rim Elastomers for Automotive Exterior Body Panels", J. Cellular Plastics, 268–273 (1981).

*Primary Examiner*—Allan R. Kuhns
*Attorney, Agent, or Firm*—Joseph C. Gil; Richard E. L. Henderson

[57] ABSTRACT

This invention relates to a reaction injection molding process for preparing a molded product by reaction of a mixture of
(a) an organic polyisocyanate;
(b) one or more compounds containing at least two isocyanate-reactive groups;
(c) about 2 to about 20% by weight, based on the weight of the molded product, of rigid fibers having a diameter of from about 5 to about 10 micrometers and a length ranging from the diameter of the fiber up to about 2 millimeters, preferably in admixture with component (b); and, optionally,
(d) an inert gas dissolved in at least one of components (a) or (b) in an amount sufficient to produce a molded product having a density of at least 0.80 g/cm³; and
(e) up to 15% by weight, based upon the weight of the molded product, of a filler other than rigid fibers (c).

10 Claims, No Drawings

PROCESS FOR THE PREPARATION OF FILLED URETHANE-BASED REINFORCED MOLDINGS

This application is a continuation of application Ser. No. 08/123,318 filed Sep. 17, 1994, now abandoned.

BACKGROUND OF THE INVENTION

This invention relates to a reaction injection molding process for preparing molded urethane-based products containing rigid fibers having a diameter of from about 5 to about 10 micrometers as a reinforcing filler.

The use of fillers in polyurethanes is well known. For example, structural polyurethanes manufactured by reaction injection molding ("RIM") typically contain one or more reinforcing fillers. The selection of the type and quantity of reinforcing fillers in polyurethanes prepared by the RIM process is in general based on the desired performance criteria. The addition of fillers to structural parts provides benefits for a number of reasons, including improved modulus, altered thermal properties such as sag, shrink, and thermal expansion. Fillers are typically added to the isocyanate-reactive component but can sometimes also be added to the isocyanate component as well.

Milled glass fiber has been widely used as a filler for polyurethanes. E.g., U.S. Pat. Nos. 4,381,352, 4,680,214, and 4,861,803. The standard milled glass fiber used in the polyurethane industry has a diameter of about 16 micrometers and nominal lengths referred to as "1/32 inch", "1/16 inch", " 1/8 inch", or "1/4 inch" (preferably "1/16 inch"). E.g., S. H. Metzger, Jr. and K. Seel, "High Modulus RIM Elastomers for Automotive Exterior Body Panels" in *J. Cell. Plastics*, 268–273 (1981); see also U.S. Pat. No. 4,381,352. The term "nominal length" as used in the glass industry does not refer to average lengths for a given fiber sample but is instead related to the size of a sieve through which the samples can pass. Within the glass industry, the length of a glass fiber can be expressed in various ways, such as average fiber length or as bulk density. For example, the average length of a "1/16-inch" milled glass fiber is about 0.006 inches (0.15 mm), with the range being from about 0.001 inches (0.025 mm) to about 0.04 inches (1.0 mm), and the bulk density of such a fiber is about 0.500 g/cm$^3$.

It has now been found that rigid fiber, particularly milled glass fiber, having a diameter ranging from 5 to 10 micrometers provides unexpected advantages when used as a filler for urethane-based products. For example, reinforced polyurethanes prepared using milled glass fibers having a diameter of about 5 to about 10 micrometers exhibit physical properties that are equal to or better than reinforced polyurethanes containing more than twice the quantity of 16 micrometer glass fibers.

SUMMARY OF THE INVENTION

The present invention relates to a reaction injection molding process for preparing a molded product comprising reacting a mixture of (a) an organic polyisocyanate;

(b) one or more compounds containing at least two isocyanate-reactive groups; and (c) about 2 to about 20% by weight (preferably 4 to 8% by weight), based on the weight of the molded product, of rigid fibers (preferably milled glass fibers) having a diameter of from about 5 to about 10 micrometers (preferably 7 to 8 micrometers and more preferably 7.5 micrometers) and a length ranging from about the diameter of the fiber up to about 2 millimeters (preferably up to 0.5 millimeters), preferably in admixture with component (b).

The present invention preferably relates to a reaction injection molding process according to the invention in which the reaction mixture additionally comprises (d) an inert gas (preferably air and/or nitrogen gas) dissolved in at least one of components (a) or (b)in an amount sufficient to produce a molded product having a density of at least about 0.80 g/cm$^3$ (preferably 0.85 to 1.10 g/cm$^3$); and (e) up to about 15% by weight (preferably from 1 to 10% by weight and most preferably from 4 to 7% by weight), based upon the weight of the molded product, of a filler other than rigid fibers (c) added to at least one of components (a) or (b) (preferably component (b)).

DETAILED DESCRIPTION OF THE INVENTION

Suitable rigid fibers for use as component (c) according to the present invention include glass fibers, preferably milled glass fibers, and other essentially incompressible inorganic or organic fibers having a diameter that ranges from about 5 to about 10 micrometers (preferably 7 to 8 micrometers and more preferably 7.5 micrometers) and a length that is at least about equal to the diameter and ranges up to about 2 millimeters (preferably up to 0.5 millimeters). Suitable milled glass fibers, for example, can be obtained by hammer milling longer glass fibers prepared, for example, by extruding molten glass through appropriate dies. Examples of the less preferred inorganic fibers include mineral fibers having the appropriate dimensions. Examples of the less preferred organic fibers include nylon, aramid, and other such fibers having the appropriate dimensions. Regardless of whether fibers (c) are milled glass fibers or other materials, they should be both heat resistant and essentially incompressible when subjected to elevated temperatures and pressure during the molding process.

It is generally preferred to use rigid fibers to which a liquid sizing agent is applied during or after manufacture of the fiber. Glass fibers having an organic coating are particularly preferred. E.g., U.S. Pat. Nos. 4,804,771 and 4,849, 263.

Suitable polyisocyanates for use as component (a) according to the present invention include aliphatic, cycloaliphatic, araliphatic, aromatic and heterocyclic polyisocyanates which are known and described, for example, by W. Siefken in *Justus Liebigs Annalen der Chemie*, 562, pages 75–136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures thereof; 1-isocyanato-3,3,5-trimethyl-5-isocyanatomethyl-cyclohexane (isophorone diisocyanate or IPDI); 2,4- and 2,6-hexahydrotoluene diisocyanate and mixtures thereof; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-toluene diisocyanate and mixtures thereof; diphenylmethane 2,4'- and/or 4,4'-diisocyanate; naphthylene 1,5-diisocyanate; triphenylmethane- 4,4',4"-triisocyanate; and polyphenyl polymethylene polyisocyanates of the type obtained by condensing aniline with formaldehyde, followed by condensation.

it is preferred to use the readily available polyisocyanates such as 2,4- and 2,6-toluene diisocyanate and mixtures of such isomers; polyphenyl polymethylene polyisocyanates of the type obtained by condensing aniline with formaldehyde, followed by phosgenation; and polyisocyanates containing carbodiimide groups, urethane groups, allophanate groups, isocyanurate groups, urea groups, or biuret groups. Particularly preferred are the liquid derivatives of 4,4'-diphenylmethane diisocyanate (MDI) which may be liquefied by introducing carbodiimide groups, blending with 2,4'-diphenylmethane diisocyanate or by introducing urethane groups. Especially preferred are the liquefied derivatives of MDI prepared by reacting MDI with 0.1 to 0.3 reels of a polypropylene glycol having a molecular weight of up to about 700, in particular, dipropylene glycol, tripropylene glycol or mixtures thereof as disclosed, for example, in U.S. Pat. No. 3,644,457.

Also suitable for use as polyisocyanate component (a) are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Suitable reactants for preparing the products of the present invention include isocyanate-reactive compounds (b) containing at least two isocyanate-reactive groups. These compounds may be divided into two groups, high molecular weight compounds having molecular weights of from 400 to about 10,000 and low molecular weight compounds (i.e., chain extenders) having molecular weights of from 62 to 399. Examples of suitable high molecular weight compounds include the polyesters, polyethers, polythioethers, polyacetals, and polycarbonates containing at least 2, preferably 2 to 8 and most preferably 2 to 4 isocyanate-reactive groups of the type known for the production of polyurethanes.

High molecular weight polyethers suitable for use in accordance with the invention are known and may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water, alcohols, or amines. Examples of alcohols and amines include the low molecular weight chain extenders set forth hereinafter, 4,4'-dihydroxydiphenylpropane, sucrose, aniline, ammonia, ethanolamine, and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351, 3,304,273, 3,523,093, and 3,110,695; and German Patent 1,152,536), are also suitable, as are polybutadienes containing OH groups.

In addition, polyether polyols that contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent (preferably divalent) carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted (for example, by halogen atoms). The polycarboxylic acids and polyols used to prepare the polyesters are known and described, for example, in U.S. Pat. Nos. 4,098,731 and 3,726,952, herein incorporated by reference in their entirety. Suitable polythioethers, polyacetals, polycarbonates, and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders and Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Höchtlen, Carl Hanser Verlag, Munich, 1966, pages 45–71.

Suitable aminopolyethers which may be used in accordance with the present invention as high molecular weight compounds (the molecular weight always being the average molecular weight which may be calculated from the functionality and the content of isocyanate-reactive groups) are those in which at least about 30 and preferably about 60 to 100 equivalent percent of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by known methods. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, or chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and in French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428, and 4,016,143. Polyethers containing terminal aromatic amino groups are formed in this way.

According to German Offenlegungsschrift 2,546,536 and

U.S. Pat. No. 3,865,791, relatively high molecular weight compounds containing terminal amino groups are obtained by reaction of NCO prepolymers based on polyhydroxypolyethers with enamines, aldimines, or ketimines containing hydroxyl groups and subsequent hydrolysis.

It is preferred to use amino polyethers obtained by hydrolysis of compounds containing terminal isocyanate groups, for example, in accordance with German Offenlegungsschrift 2,948,419 or U.S. Pat. No. 4,515,923, herein incorporated by reference in its entirety. In this process, polyethers most preferably containing 2 to 4 hydroxyl groups are allowed to react with polyisocyanates to form NCO prepolymers and, in a second step, the isocyanate groups are converted by hydrolysis into amino groups.

The aminopolyethers used in accordance with the invention are often mixtures of the compounds mentioned by way of example and (on a statistical average) most preferably contain 2 to 4 terminal isocyanate-reactive groups. In the process according to the invention, the aminopolyethers may be used in admixture with polyhydroxypolyethers free from amino groups.

In accordance with the present invention, the high molecular weight compounds are used in admixture with up to about 95% by weight (preferably up to about 50% by weight, more preferably about 8 to 30% by weight, and most preferably about 12 to 26% by weight), based on the total quantity of the high molecular weight compounds, of the low molecular weight chain extenders. Examples of suitable hydroxyl group-containing chain extenders include ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, and trimethylolpropane.

Other suitable chain extenders include aromatic polyamines (preferably diamines) having molecular weights of less than 400, especially the sterically hindered aromatic polyamines (preferably diamines) having molecular weights of less than 400, especially the sterically hindered aromatic diamines which contain at least one linear or branched alkyl substituent in the ortho-position to the first amino group and at least one (preferably two) linear or branched alkyl substituents containing from 1 to 4 (preferably 1 to 3) carbon atoms in the ortho-position to a second amino group. These aromatic diamines include 1-methyl-3,5-diethyl-2,4-diaminobenzene, 1-methyl-3,5-diethyl-2,6-diaminobenzene, 1,3,5-trimethyl-2,4-diaminobenzene, 1,3,5-triethyl-2,4-diaminobenzene. 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,5-diethyl-5,5'-diisopropyl-4,4'-diaminodiphenylmethane, 1-methyl-2,6-diamino-3-isopropylbenzene, and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15 (preferably about 65:35 to 80:20).

In addition, aromatic polyamines may be used in admixture with the sterically hindered chain extenders and include, for example, 2,4- and 2,6-diaminotoluene, 2,4'- and/or 4,4'-diaminodiphenylmethane, 1,2- and 1,4-phenylenediamine, naphthalene-1,5-diamine and triphenylmethane-4,4',4''-triamine. The difunctional and polyfunctional aromatic amine compounds may also exclusively or partly contain secondary amino groups such as 4,4'-di(methylamino)diphenylmethane phenylmethane or 1-methyl-2-methylamino-4-aminobenzene. Liquid mixtures of polyphenyl polymethylenepolyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

In a preferred embodiment of the invention, which is particularly suitable for preparing low-density products, an inert gas (d) is introduced into one or more of the reactive components (preferably into component (b)) using techniques known in the art. As used herein, the term "inert gas" refers to gaseous materials that are essentially unreactive under the conditions used in the process of the invention. Examples of suitable inert gases include air, nitrogen, argon, carbon dioxide, or mixtures thereof. When preparing the preferred low density products, the inert gas is introduced in sufficient quantity to give products having a density of at least about 0.80 g/cm$^3$ (preferably ranging from 0.85 to 1.10 g/cm$^3$).

The inert gas is preferably introduced using commercial equipment, such as Diffuser Stone-KIMEX mixers and venturi type mixers. The presently preferred device is a Hennecke Aeromat-GU which is described in Hennecke Trade Bulletin #41 and in a 1991 article entitled "Consistent Distribution of Finely Dispersed Gases in Polyol Streams", Proksa et al, in Polyurethanes World Congress 1991. Sufficient inert gas is customarily introduced into the system in an amount in excess of the amount necessary to saturate the particular component at a feed tank pressure of from about 0.21 to about 0.35 N/mm$^2$. As is known in the ad, material flows from the feed tank through a transfer pump (which increases the pressure of the particular component) through a metering pump to the mixhead. Discharge pressures of the transfer pump are generally in the range of 0.35 to 0.7 N/mm$^2$, while discharge pressures of the metering pump are generally in the range of 14 to 21 N/mm$^2$. The amount of the gas in the system is generally monitored using commercial measuring equipment which responds to changes in specific gravity of the liquid components. One such device is the Dynatrol (manufactured by Automation Products), which permits the effective control of the gas content by monitoring any changes in the specific gravity of the liquid component.

When preparing low density products, factors that are important to achieving high quality low density product include enhanced flow characteristics and reduced nucleation density of the isocyanate-reactive component. Good flow properties are important because relatively smaller quantities of reactive materials are required for low density products. Reduced nucleation density is directly related to an increased amount of inert gas dissolved or dispersed in the isocyanate-reactive component and ultimately to a lower density product. The use of rigid microspheres according to the present invention has been found to be particularly useful in enhancing both the flow characteristics and the nucleation density of the isocyanate-reactive component, as well as reducing the time required to achieve a given nucleation density. As a result, a significant reduction in density for the molded parts is achieved while at the same time improving demold characteristics (such as mold release, green strength, and hot tear strength) without adversely affecting physical properties. In fact, impact resistance is consistently improved. The use of hollow rather than solid microspheres provides an even further reduction in density, while still providing improved physical properties and demold characteristics, and is thus particularly preferred.

In a preferred embodiment, up to about 15% by weight, relative to the rigid fibers (c), of additional fillers (e) are also included in the reaction mixture. Suitable fillers include reinforcement fillers and other types of fillers known in the art for use with urethane-based products. Reinforcement fillers that allow reduced contraction of the molded product upon cooling, as well as adjustment of tensile modulus and flex modulus, are well known in the art. Suitable inorganic reinforcement fillers include glass in the form of fibers (other than fibers having the characteristics specified for component (c)) or flakes, mica, wollastonite, carbon black, talc, calcium carbonate, and carbon fibers. Organic fillers, although less preferred, are also suitable for reinforcement.

Particularly preferred additional fillers (e) include rigid and compressible microspheres.

Suitable rigid microspheres for use as an additional filler (e) according to the invention can be hollow microspheres (also known as microballoons or microbubbles) or solid microspheres. When preparing low-density materials, for example, hollow spheres are generally preferred. However, regardless of whether the microspheres are hollow or solid, they should be heat resistant and essentially incompressible when subjected to elevated temperatures and pressure during the molding process. In a typical RIM process, compression strengths greater than about 12 mPa·s (preferably greater than 20 mPa·s) are generally suitable. With hollow microspheres, wall thickness is, of course, a selection factor. Suitably rigid microspheres may be made of inorganic materials, such as glass, ceramic, and carbon, or rigid organic polymers, such as phenolic resins. Solid microspheres can be prepared by any of several methods known in the art. For example, solid microspheres can be prepared by softening irregularly shaped particles just enough for then to flow into spheres under the influence of surface tension, by quenching a melt in a cooler medium, or by carrying out polymerizations in well-stirred suspensions at elevated temperature. Hollow inorganic microspheres can be prepared by several known methods. For example, hollow glass spheres can be prepared by grinding and sizing soda-lime glass cullet to form particles that, in combination with blowing agents, are passed through a gas flame (ca. 1000° C.) to soften the glass and generates gases that expand the particles. See U.S. Pat. No. 3,365,315. Hollow glass spheres can also be prepared by spray-drying a sodium borosilicate solution containing a blowing agent to form a particulate material that is passed through a gas flame to form the spheres. See U.S. Pat. No. 2,978,339. Ceramic microspheres can be obtained as both solid and hollow microspheres as a normal aluminosilicate by-product of burning coal. In general, hollow ceramic microspheres are heavier than similarly sized glass microspheres. Although inorganic microspheres can be treated with a silane or titanate coupling agent to enhance adhesion with the matrix urethane polymer, the untreated particles generally exhibit sufficient adhesion to the polymer, making such treatments unnecessary. Commercially available hollow inorganic microspheres include ceramic Z-Light Spheres and glass Scotchlite K46 Glass Bubbles from 3M Company. Commercially available glass microspheres typically contain about 72 wt. % $SiO_2$, 14 wt. % $Na_2O$, 10 wt. % $CaO$, 3 wt. % $MgO$, and 1 wt. % $Al_2O_3/K_2O/Li_2O$, whereas commercially available ceramic microspheres typically contain about 50–58 wt. % $SiO_2$, 25–30 wt. % $Al_2O_3$, 6–10 wt. % $CaO$, 1–4 wt. % $Na_2O/K2O$, and 1–5 wt. % other oxides. E.g., J. F. Plummer, "Microspheres" in *Encyclopedia of Polymer Science and Technology*, Vol. 9 (John Wiley & Sons, Inc., 1987), page 788. Solid microspheres of organic polymers can be prepared using aqueous dispersions of suitable film-forming thermoset or thermoplastic materials. In the presence of a blowing agent, this method gives hollow microspheres. It is typical of available rigid microspheres that a given sample contains a range of sizes. Suitable microspheres for the present invention typically have a diameter of between about 1 and about 350 μm (preferably 10 to 210 μm. The specific size range, however, is often dependent on the selection of particular injection equipment and operating parameters (for example, nozzle diameter). Low density (especially hollow) microspheres are preferred, with those having densities ranging from 0.05 to 2.5 $g/cm^3$ being particularly preferred. The rigid microspheres can be added to either the isocyanate component or the isocyanate-reactive component, although addition to isocyanate-reactive component (b) is preferred.

Although less preferred, it is also possible to include known compressible expanded microspheres, such as those described in U.S. Pat. Nos. 4,038,238, 4,829,094, 4,843,104, 4,902,722 and 4,959,395, and Japanese Patent Publication 60-244511. Commercially available compressible microspheres include Dualite M6017AE, Dualite M6001AE, and Dualite M6029AE, all available from Pierce & Stevens Corporation, and Expancel available from Nobel Industries. These commercially available compressible microspheres are expanded, hollow microspheres consisting of a thin shell of a vinylidene chloride, polypropylene, or acrylonitrile copolymer. The interior of the Dualite and Expancel microspheres contains a volatile liquid, such as a low-boiling hydrocarbon (which is pentane for Dualite microspheres and isobutane for Expancel microspheres), which is used to expand the microsphere and remains inside the shell thereafter. An organic or inorganic material that decomposes upon only moderate heating will also serve to expand the microsphere, with the decomposition products remaining in the shell thereafter. Also present on the outside of Dualite microspheres is a rough coating of calcium carbonate dust.

It is also possible to use compressible microspheres in combination with rigid microspheres, but the amount of compressible microspheres should preferably not exceed 50% by weight of the amount of the rigid microspheres.

Additives which may be used in the present invention include catalysts, especially tin(II) salts of carboxylic acids, dialkyltin salts of carboxylic acids, dialkyltin mercaptides, dialkyltin dithioesters, and tertiary amines. Preferred among these catalysts are dibutyltin dilaurate and 1,4-diazabicyclo [2,2,2]octane (triethylene diamine), especially mixtures of these catalysts. The catalysts are generally used in amounts of about 0.01 to 10% (preferably about 0.05 to 2%), based on the weight of the high molecular weight component.

It is also possible to use surface-active agents such as emulsifiers and foam stabilizers. Examples include siloxanes, N-stearly-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxyethyl imidazole derivative of oleic acid, N-stearyl propylene diamine, and the sodium salts of castor oil sulfonates or of fatty acids. Alkali metal or ammonium salts of sulfonic acid, such as dodecylbenzenesulfonic acid or dinaphthylmethanesulfonic acid, and fatty acids may also be used as surface-active additives. Particularly suitable surface-active compounds include polyether siloxanes of the type generally known for use in the polyurethane art, such as water-soluble polyether siloxanes. The structure of these siloxanes is generally such that a copolymer of ethylene oxide and propylene oxide is attached to a polydimethylsiloxane functionality. Methods of manufacturing preferred siloxanes are described in U.S. Pat. No. 4,906,721, the disclosure of which is herein incorporated by reference.

It is also possible to use mold release agents, which are compounds that are added to the reactive components of the isocyanate addition reaction, usually the isocyanate-reactive component, to assist in the removal of a polyurethane product from a mold. Suitable mold release agents for the present invention include those based at least in pad on fatty acid esters (e.g., U.S. Pat. Nos. 3,726,952, 3,925,527, 4,058,492, 4,098,731, 4,201,847, 4,254,228, 4,868,224, and 4,954,537 and British Patent 1,365,215); metal and/or amine salts of carboxylic acids, amido carboxylic acids, phosphorus-containing acids, or boron-containing acids (e.g., U.S. Pat. Nos. 4,519,965, 4,581,386, 4,585,803, 4,876,019, 4,895,879, and 5,135,962); polysiloxanes (e.g., U.S. Pat. No. 4,504,313); amidines (e.g., U.S. Pat. Nos. 4,764,540, 4,789,688, and 4,847,307); resins prepared by the reaction of isocyanate prepolymers and a polyamine-polyimine component (e.g., U.S. Pat. No. 5,198,508); and neutralized esters prepared from certain amine-started tetrahydroxy compounds described in U.S. Pat. No. 5,208,268. Particularly preferred mold release agents contain zinc stearate.

In addition to the additional fillers, catalysts, surface-active agents, and mold release agents mentioned above, other additives which may be used in the molding compositions of the present invention include blowing agents, cell regulators, flame retarding agents, plasticizers, and dyes of the types generally known in the art.

The compositions according to the present invention are especially suited for processing by the RIM process. In general, two separate streams are intimately mixed and subsequently injected into a suitable mold, although it is possible to use more than two streams. In a preferred embodiment, the first stream contains the polyisocyanate component, whereas the second stream contains the isocyanate-reactive component, chain extender, rigid fibers and other fillers, any internal mold release agent, and any other additives which are to be included. Although generally less preferred, it is, of course, also possible to add the rigid fibers and/or other fillers to the polyisocyanate component. Regardless of which reactive component contains the rigid fillers and/or other fillers, it is generally necessary to maintain homogeneity by agitation.

The quantity of polyisocyanate used in the process according to the present invention is preferably calculated so that the foamable mixture has an isocyanate index of from 70 to 130 (preferably from 90 to 110). By "isocyanate index" is meant the quotient of the number of isocyanate groups and number of groups which are reactive with isocyanates, multiplied by 100.

The known RIM process is used for carrying out the process according to the present invention. In general, the components may be mixed simultaneously, or the non-reactive components may be pre-mixed and then mixed with the reactive components. A starting temperature of from 10° to 70° C. (preferably from 30° to 50° C.) is generally chosen for the mixture introduced into the mold. The temperature of the mold itself is generally from 40° to 100° C. (preferably from 50° to 70° C.). After completion of the reaction and molding process, the resultant product is removed from the mold.

The moldings obtainable by the process according to the present invention are particularly suitable for the manufacture of a variety of polyurethane products. For example, in a preferred embodiment of the invention, low density products such as flexible car bumpers and car body elements can be produced. With suitable variation of the starting components, it is also possible to produce materials which have good abrasion resistance and high mechanical strength, such as flexible polyurethane shoe soles.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

An isocyanate-reactive blend was prepared using 76.8 pads of a trifunctional polyether polyol having a molecular weight of 6000 (glycerol started using propylene oxide and ethylene oxide at a weight ratio of about 5:1); 16 parts of diethyltoluene diamine ("DETDA"); 7 pads of a zinc stearate concentrate containing 3 parts of a diamine having a molecular weight of 400 available as JEFFAMINE® D-400 from Texaco, 2 parts of zinc stearate, and 2 parts of a tetrafunctional polyol having a molecular weight of 356 prepared from ethylene diamine and propylene oxide; 0.1 parts of triethyleneamine (available as DABCO® 33-LV from Air Products and Chemicals, Inc.); 0.05 pads of dibutyltin dilaurate (available as DABCO® T-12 from Air Products and Chemicals, Inc.); and 0.05 parts of dimethyltin dilaurate (available as FORMEZ® UL-28 from Witco Corporation).

A slurry based on this isocyanate-reactive blend was prepared for reinforced reaction injection molding ("RRIM") by adding 13 parts of a milled glass fiber having a diameter of 7.5 μm and a nominal length of "1/16 inch" (i.e., actual length range of about 7–500 μm) (available as 742-A from Owens Corning) per 100 parts of the isocyanate-reactive blend. The isocyanate-reactive slurry was charged to the polyol run tank of a Hennecke LK-06 RRIM machine and nucleated by introduction of nitrogen gas using a hollow-shaft high-speed cavitation-type nucleator until a nucleation density level of 0.72 g/cm$^3$ was obtained.

The isocyanate-reactive slurry was allowed to react with an isocyanate prepared from 4,4'-diphenylmethane diisocyanate and tripropylene glycol and having an NCO content of about 22.5% using 47 parts of isocyanate per 100 parts of slurry. Urethane parts were molded using the Hennecke LK-06 RRIM machine using a steel mold (P-2 steel) having the dimensions of 3 mm×20 cm×30 cm. The reactant temperatures were 43° to 46° C. for the isocyanate and 52° to 57° C. for the isocyanate-reactive slurry, and the mixing pressure for both components was 20 mPa·s. Physical properties of the resultant polyurethane are shown in Table 1.

Example 2 (comparison)

A isocyanate-reactive slurry was prepared according to Example 1 except for using 27 parts of milled glass fibers having a larger diameter of 16 μm and a nominal length of "1/16 inch" (available as 737-BD from Owens Corning) per 100 parts of the isocyanate-reactive blend. The isocyanate-reactive slurry was charged to the polyol run tank of a Hennecke LK-06 RRIM machine and nucleated as in Example 1 until a nucleation density level of 0.77 g/cm³ was obtained.

The isocyanate-reactive slurry was allowed to react with the same isocyanate as used in Example 1 using 42 parts of isocyanate per 100 parts of slurry. Urethane parts were molded as in Example 1. Physical properties of the resultant polyurethane are shown in Table 1.

TABLE 1

Physical properties for Example 1 and comparison Example 2.

|  | Example 1 | Example 2 |
|---|---|---|
| Density (g/cm³) | 1.05 | 1.10 |
| Flexural modulus (mPa · s) | 495 | 428 |
| Tensile strength (mPa · s) | 18.3 | 14.1 |
| Elongation (%) | 145 | 135 |
| Tear strength (N/mm) | 84.9 | 72.3 |
| Heat sag (mm)[(1)] | 6.5 | 8.9 |
| Shrink (%) | 0.39 | 0.71 |

[(1)]Heat sag using 15-cm overhang at 250° C. for one hour.

Despite the use of a smaller quantity of glass fiber, the filled polyurethane of Example 1 containing milled 7.5-μm diameter glass fiber exhibits physical properties that match or exceed those of the polyurethane of comparison Example 2 containing a standard 16-μm diameter glass fiber.

Example 3

Example 1 was repeated except for using a different isocyanate-reactive blend prepared using 72.25 parts of the trifunctional polyether polyol used in Example 1; 19 parts of DETDA; 8 pads of a zinc stearate concentrate containing 4 parts of the diamine used in Example 1, 2 parts of zinc stearate, and 2 parts of the tetrafunctional polyol used in Example 1; 0.1 parts of triethyleneamine; 0.05 parts of dibutyltin dilaurate; 0.1 parts of dimethyltin dilaurate; and 0.5 parts of a polysiloxane available as TEGOSTAB® B-8481 from Goldschmidt.

A slurry based on this isocyanate-reactive blend was prepared for reinforced reaction injection molding by adding 14 pads of the milled 7.5-pro diameter glass fiber used in Example 1 and 1.7 pads of DUALITE® M-6017-AE microspheres (available from Pierce & Stevens Corporation) per 100 parts of the isocyanate-reactive blend. The isocyanate-reactive slurry was charged to the polyol run tank of a Cincinnati Milacron CM-90 RRIM machine and nucleated by introduction of nitrogen gas as in Example 1 until a nucleation density level of 0.65 g/cm³ was obtained.

The isocyanate-reactive slurry was allowed to react with the same isocyanate as used in Example 1 using 50 parts of isocyanate per 100 parts of slurry. Urethane parts were molded using the Cincinnati Milacron CM-90 RRIM machine using a steel mold (P-2 steel) having the dimensions of 4.5 mm×64 cm×92 cm. The reactant temperatures were 43° to 46° C. for the isocyanate and 52° to 57° C. for the isocyanate-reactive slurry, and the mixing pressure for both components was 11.2 mPa·s. Physical properties of the resultant polyurethane are shown in Table 2.

Example 4

Example 1 was repeated except for using a different isocyanate-reactive blend prepared using 74.25 parts of the trifunctional polyether polyol used in Example 1; 17 parts of DETDA; 8 parts of the zinc stearate concentrate used in Example 3; 0.1 pads of triethyleneamine; 0.05 parts of dibutyltin dilaurate; 0.1 parts of dimethyltin dilaurate; and 0.5 parts of the polysiloxane used in Example 3.

A slurry based on this isocyanate-reactive blend was prepared for reinforced reaction injection molding by adding 14 pads of the milled 7.5-μm diameter glass fiber used in Example 1 and 7.8 pads of ceramic Z-Light Spheres (available from 3M Company) per 100 parts of the isocyanate-reactive blend. The isocyanate-reactive slurry was charged to the polyol run tank of a Cincinnati Milacron CM-90 RRIM machine and nucleated as in Example 1 until a nucleation density level of 0.63 g/cm³ was obtained.

The isocyanate-reactive slurry was allowed to react with the same isocyanate as used in Example 1 using 45 parts of isocyanate per 100 parts of slurry. Urethane parts were molded as in Example 3. Physical properties of the resultant polyurethane are shown in Table 2.

TABLE 2

Physical properties for Examples 3 and 4.

|  | Example 3 | Example 4 |
|---|---|---|
| Density (g/cm³) | 0.96 | 0.97 |
| Flexural modulus (mPa · s) | 438 | 379 |
| Tensile strength (mPa · s) | 15.8 | 14.9 |
| Elongation (%) | 81 | 70 |
| Tear strength (N/mm) | 74.9 | 70.0 |
| Heat sag (mm)[(1)] | 13.0 | 17.0 |

[(1)]Heat sag using 15 cm overhang at 250° C. for one hour.

What is claimed is:

1. A reaction injection molding process for preparing a molded product comprising reacting (a) an organic polyisocyanate with a mixture consisting essentially of (b) one or more compounds containing at least two isocyanate-reactive groups;

(c) 2 to 20% by weight, based on the weight of the molded product, of rigid fibers having a diameter of from 7 to 10 micrometers and a length ranging from the diameter of a fiber up to 2 millimeters;

(d) optionally, an inert gas dissolved in component (b) in an amount sufficient to produce a molded product having a density of at least 0.80 g/cm³;

(e) 0 to 15% by weight, based upon the weight of the molded product, of a filler other than rigid fibers added to component (b); and (f) optionally, a mold release agent.

2. The process according to claim 1 wherein said rigid fibers are milled glass fibers.

3. A process according to claim 2 wherein the mold release agent contains zinc stearate.

4. A process according to claim 2 wherein the milled glass fibers have a diameter of 7 to 8 micrometers.

5. A process according to claim 2 wherein the milled glass fibers have a diameter of 7.5 micrometers.

6. A process according to claim 2 wherein the milled glass fibers are present in an amount of from 4 to 8% by weight, based upon the amount of the molded product.

7. A process according to claim 2 wherein the inert gas is air and/or nitrogen gas.

8. A process according to claim 2 wherein the inert gas is dissolved in component (b) in an amount sufficient to produce a molded product having a density of 0.85 to 1.10 g/cm³.

9. A process according to claim 2 wherein filler (e) is used in an amount of from 1 to 10% by weight based upon the weight of the molded product.

10. A process according to claim 2 wherein filler (e) is selected from the group consisting of rigid microspheres, compressible microspheres, mica, wollastonite, carbon black, talc, calcium carbonate, and carbon fibers.

* * * * *